3,359,169
ALUMINUM COMPOUNDS

Joseph N. Slater, Jr., New York, Herman E. Jass, Hartsdale, and Isidore Ugelow, West Babylon, N.Y., assignors to Revlon, Inc., New York, N.Y., a corporation of Delaware
No Drawing. Filed Apr. 27, 1962, Ser. No. 190,825
10 Claims. (Cl. 167—90)

This invention relates to novel aluminum compounds and to methods for making the same. In particular, this invention relates to the reaction of aluminum chloride and aluminum chlorohydroxides with hydroxylic organic compounds, to the products produced, and to compositions containing said products.

The compounds prepared according to the invention are useful astringents in antiperspirants, or as cosmetic fresheners, or for topical application, for example. The use of aluminum compounds as astringents, for example for incorporation into antiperspirant compositions, has been long known in the art. However, prior art astringent aluminum compounds show only a limited solubility in organic solvents such as ethyl alcohol, and have been difficult to incorporate into solvent-containing antiperspirant compositions in the amounts required for greatest efficacy.

The compounds prepared according to the present invention have a high degree of solubility in ethyl alcohol as well as in other components, e.g. glycols, commonly included in antiperspirant compositions, and hence can be used in such compositions to great advantage. It is desirable that an antiperspirant composition have a relatively high content of alcohols and/or glycols to decrease drying time and to reduce powdering, as compared with purely water-based compositions. The presence of these organic constituents also permits the addition to antiperspirant compositions of other materials which are not normally compatible with or soluble in water.

Also, the good solubility of the astringent compounds of the invention in substances such as alcohol permits the use of these substances as co-solvents for dispersing the astringents in liquefied halogenated hydrocarbons commonly used as propellants in aerosol packages. Thus, the astringents of the invention are of particular utility in the preparation of aerosol-packaged compositions.

The novel compounds of the invention are prepared by reacting aluminum compounds of the formula

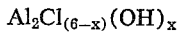

where $x$ is a number from zero to five, preferably from one to five, with a hydroxylic reagent, including alcohols and ethers having at least one hydroxy group, suitably one to three hydroxy groups. The hydroxylic substances include polyhydroxy alkyl compounds, e.g. glycols such as ethylene glycol, propylene glycol, and 1,4-butanediol, as well as unsaturated aliphatic hydrocarbon materials such as 1,4-butenediol and the like. Aliphatic ether glycols having one or more ether linkages in the carbon chain (e.g. polyoxyalkylene glycols having a molecular weight up to about 500, preferably to about 200) are suitable, such as diethylene glycol, dipropylene glycol, triethylene glycol, and tetraethylene glycol, for example. The invention is not limited to substances having only primary hydroxy groups, but also includes materials such as 1,3-butanediol, glycerol, and diglycerol, for example. The last two mentioned materials are representative of polyhydroxy compounds having more than two hydroxy groups, and such polyhydroxy compounds as these and others, e.g. 1,2,6-hexanetriol, 1,2,4-butanetriol, and trimethylolpropane, etc. can suitably be employed in the invention. Trimethylolpropane, in addition, is representative of numerous branch chain polyhydric alcohols which can be employed according to the invention, e.g. 2-methyl, 2-ethyl, 1,3-propanediol; 2-methyl, 2,4-pentanediol; and the like. Monohydroxy aliphatic glycol monoethers, i.e. mono-etherified glycols and ether glycols such as diethylene glycol monomethyl ether and diethylene glycoi monoethyl ether, are also comprehended in the invention.

To prepare the compounds of the invention, the hydroxylic reagent and an appropriate aluminum compound such as a chlorohydroxide compound prepared, for example, according to the procedure mentioned in Australian Patent 150,410 of Mar. 15, 1953, are contacted, in the proportions desired in the final product, in the presence of sufficient water to dissolve all of the aluminum compound. The novel compounds of the invention are obtained on removal of water from the system. Conveniently, the water is removed by evaporation at room temperature or below, or at an elevated temperature suitably up to about 80° C. Particularly good results are obtained by evaporation at a temperature between about 50°–60° C., at which temperatures evaporation proceeds relatively rapidly, and there is no question of possible decomposition of the products by the use of excessive temperatures. At any of these temperatures, reduced pressure, for example, a pressure of 25 mm. Hg furnished by an aspirator, may be employed to speed the removal of water, but is by no means necessary. Also, the use of reduced pressure may be employed to speed the removal of water when temperatures below room temperature (about 18°–25° C.) are employed, or to reduce heating time when temperatures greater than 80° C. are used. The product is conveniently obtained by heating the reactant solution, for example on a hot plate, permitting volatile components to evaporate with spontaneous crystallization of the reaction product. The product is soluble in alcohol and water and can be recrystallized from alcohol, e.g. ethanol, or water, or can be precipitated from alcohol or water solutions by the addition of a non-polar solvent such as ether or acetone.

A variety of products having astringent properties can be produced when the aluminum compound

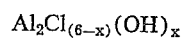

is reacted with the hydroxylic component in molar ratios varying between about 6:1 and about 1:6, preferably between about 5:1 and 1:5. If the alcohol is in a molar excess, as compared with a 1:1 molar ratio, liquid products are obtained. The solid products preferred for use as astringents in antiperspirant compositions are prepared from reaction mixtures having a molar ratio of aluminum to alcohol between about 3:1 and about 1:1. Compositions having particularly good properties for use in antiperspirant compositions are obtained by reacting the aluminum compound with the alcohol in a molar ratio between about 1.7:1 and about 2.8:1, optimally about 2.3:1.

Within these preferred ranges, the alcohol solubility of the product is maximized in those compounds prepared by reacting more than 4 molar parts of the aluminum compound with 1 molar part of alcohol. In other reaction products, a slightly lower alcohol solubility is observed.

If products are prepared by reacting more than 1 molar part of aluminum compound per molar part of alcohol, it is convenient to permit the alcohol and aluminum compound to stand for a time, e.g. overnight, in the presence of water before heating. This extended standing brings about a more thorough solvation of the aluminum compound, and promotes a more efficient synthesis.

The nature of the reaction between the aluminum compound and the hydroxy compound is not known. The evolution of HCl during the reaction has been observed, and it has been proposed, but is not clear, that the reaction is a formation of aluminum esters from the alcohols by displacement of chlorine. Such a reaction could permit the formation of complex polymeric products from the polyfunctional reagents reacted according to the invention, and it has not proved possible to determine the exact nature of any of the products produced.

The resulting compounds can be employed in any antiperspirant composition having an aqueous and/or alcoholic base, including roll-on lotions, pourable compositions, creams, impregnated pads, sticks, aerosol sprays, and the like, or can be used in powder preparations. Suitable compositions of these types are known in the art, but particularly good results have been obtained by using the new aluminum compounds in roll-on, aerosol, and liquid cream deodorants of the type respectively set forth below. In each case, both typical and preferred compositions have been indicated in parts by weight.

| Ingredient | Preferred | Typical |
|---|---|---|
| Aluminum alcohol complex | 20-40 | 10-50 |
| Water | 5-25 | 5-30 |
| Anti-tack agent (e.g. water soluble fluid silicone polymers) | 0-5 | 0-5 |
| Anhydrous ethanol | 20-45 | 0-60 |
| Film-forming resin for inhibiting transfer of the composition and reducing chance for staining (e.g. copolymer of lauryl methacrylate-N,N-diethylolaminoethyl methacrylate quaternized disulfate) | 0-4 | 0-4 |
| Perfume and color | 0-1 | 0-1 |

Suitable volatile liquid propellants are known in the art. These materials are generally fluorinated or fluorochlorinated lower saturated aliphatic hydrocarbons, suitably halogenated alkanes having one to four carbon atoms, preferably one or two carbon atoms, and at least one fluorine atom. Materials having a propellant vapor pressure between about 25 and 60 pounds per square inch at room temperature (20°–25° C.) are generally used, including, but not limited to, dichlorodifluoromethane ("Freon 12"), dichlorotetrafluoroethane, ("Freon 114"), trichloromonofluoromethane ("Freon 11"), and octafluorocyclobutane ("Freon C-138"), alone or in admixture. A particularly good composition is one containing a 3:8 mixture of "Freon 11" and "Freon 12."

A typical liquid cream composition is as follows:

| Ingredient | Preferred | Typical |
|---|---|---|
| Aluminum alcohol complex | 20 | 10-25 |
| Propylene glycol | 3 | 1-4 |
| Polyoxyethylene monostearate | 0.85 | 0.5-1.0 |
| Glyceryl monostearate | 2.5 | 1-4 |
| Methyl cellulose | 1 | 0-1.5 |
| Water | 72 | 65-80 |
| Perfume | 0.5 | 0.5 |

An astringent prepared by reacting about 2.3 molar parts of pentahydroxy-chloro-aluminum with 1 molar part of trimethylolpropane is particularly advantageous for use in antiperspirant mixtures, since this astringent maximizes the amount of aluminum present in the molecule while simultaneously retaining good solubility in organic solvents such as ethanol.

A better understanding of the present invention and of its many advantages will be had by referring to the following examples and tables showing specific embodiments for purposes of illustration.

In Table I below are shown the properties of aluminum chloride and the aluminum chlorohydroxides of interest to the present application.

TABLE I.—PROPERTIES OF CHLOROHYDROXIDES-STARTING MATERIALS

| Chlorohydroxide | Ratio by Analysis | | | Solubility, Grams of Solute/ml. of Solvent | | | | |
|---|---|---|---|---|---|---|---|---|
| | 2Al | Cl | $H_2O$ | $H_2O$ | Anhydrous Ethanol | 95% Ethanol | Propylene Glycol | Glycerol |
| $Al_2(OH)Cl_5.8H_2O$ | 1 | 5.9 | 8.5 | 1.5 | 0.2 | 0.2 | 1.0 | 1.0 |
| $Al_2(OH)_2Cl_4.6H_2O$ | 1 | 3.89 | 6.2 | 1.5 | 0.1 | 0.2 | 0.2 | 0.3 |
| $Al_2(OH)_3Cl_3.6H_2O$ | 1 | 3.35 | 6.35 | 2.0 | 0.4 | 0.4 | 0.1 | 0.6 |
| $Al_2(OH)_4Cl_2.5H_2O$ | 1 | 2.35 | 5.5 | 1.9 | 0.1 | 0.2 | 0.1 | 2.0 |
| $Al_2(OH)_5Cl.2H_2O$ | 1 | 1.1 | 1.63 | 1.5 | 0.1 | 0.1 | 0.1 | 0.1 |
| $Al_2Cl_6.12H_2O$ | 1 | 5.78 | 10.54 | 1.2 | | | | |

A typical antiperspirant composition suitable for use in aerosol bombs is as follows:

| Ingredient | Preferred | Typical |
|---|---|---|
| Aluminum alcohol complex | 5-8 | 4-15 |
| Anhydrous ethanol | 20-40 | 20-60 |
| Emollient (e.g. soluble esters, alcohols, and other compounds giving good skin touch, such as oleyl alcohol, triethyl citrate, propylene glycol monolaurate, diethyl phthalate, lanolin sterol fraction, etc.) | 1-5 | 0-10 |
| Perfume solubilizer (e.g. alcohol soluble surface active agents such as ethoxylated nonyl phenol, ethoxylated lauryl alcohol, etc.) | 0-2 | 0-2 |
| Anti-tack agents (e.g. methyl phenyl polysiloxane) | 0-3 | 0-3 |
| Perfume | 0-1 | 0-1 |
| Liquefied propellant | 40-65 | 25-75 |

Table II below compares the solubility, in various solvents, of a number of typical compounds prepared by reacting aluminum chloride or an aluminum chlorohydroxide with trimethylolpropane (TMP). From the table it can be seen that reaction of the aluminum compounds with trimethylolpropane in a fairly constant molar ratio of aluminum compound to hydroxy compound results in an increased solubility for the resultant compounds, as compared with that of the aluminum compound alone, in anhydrous ethanol and 95 percent ethanol particularly, and also in water, propylene glycol, and glycerol. The compounds were prepared by warming the reagents, in the proportions indicated, and isolating the resulting products.

TABLE II

| Formula Aluminum Compound | Mole Ratio of Chlorohydroxide to TMP | Ratio by Analysis in Final Product | | | Solubility (gm. per ml. of solvent) | | | | |
|---|---|---|---|---|---|---|---|---|---|
| | | 2Al | Cl | $H_2O$ | $H_2O$ | Anhydrous Ethanol | Ethanol 95% | Propylene Glycol | Glycerol |
| $Al_2(OH)Cl_5$ | 1.77/1.0 | 1.00 | 3.36 | 11.2 | 1.7 | 0.3 | 0.5 | 1.0 | 1.0 |
| $Al_2(OH)_2Cl_4$ | 1.67/1.0 | 1.00 | 2.46 | 10.5 | 2.2 | 0.5 | 0.6 | 1.0 | 1.2 |
| $Al_2(OH)_3Cl_3$ | 1.83/1.0 | 1.00 | 2.57 | 8.08 | 2.2 | 0.5 | 0.6 | 1.0 | 1.2 |
| $Al_2(OH)_4Cl_2$ | 1.61/1.0 | 1.00 | 1.86 | 7.93 | 3.6 | 0.9 | 1.2 | 1.0 | 1.4 |
| $Al_2(OH)_5Cl$ | 1.58/1.0 | 1.00 | 1.10 | 6.01 | 2.4 | 0.7 | 1.0 | 0.4 | 1.4 |
| $Al_2Cl_6 \cdot 12H_2O$ | 2.3/1.0 | | | | 1.5 | 0.3 | 0.3 | 1.5 | 1.0 |

In Table III below are shown the solubilities in a selection of solvents, of reaction products of a specific aluminum chlorohydroxy compound, namely $Al_2Cl(OH)_5$ with a preferred hydroxylic reagent namely trimethylolpropane.

paring anti-perspirant compositions, particularly those adaptable to aerosol spray packaging, a minimum solubility of the aluminum complex in anhydrous ethanol or 95 percent ethanol should be at least 30 percent (i.e. 0.3 gram per ml.), and preferably at least 40 percent.

TABLE III

| Mole Ratio of Chlorohydroxide to TMP | Ratio by Analysis in Final Product | | | Solubility (gm. per ml. of solvent) | | | | |
|---|---|---|---|---|---|---|---|---|
| | 2Al | Cl | $H_2O$ | $H_2O$ | Anhydrous Ethanol | 95% Ethanol | Propylene Glycol | Glycerol |
| 1.0/5.0 | 1.00 | 1.34 | 3.90 | 5.3 | 1.1 | 1.5 | 2.0 | 1.9 |
| 1.0/4.0 | 1.00 | 1.31 | 3.60 | 6.0 | 1.2 | 1.5 | 3.0 | 2.0 |
| 1.0/3.0 | 1.00 | 1.11 | 2.52 | 4.8 | 1.1 | 1.5 | 2.3 | 2.0 |
| 1.0/2.0 | 1.00 | 1.02 | 2.46 | 6.0 | 1.2 | 2.0 | 2.3 | 2.0 |
| 1.0/1.0 | 1.00 | 1.15 | 1.90 | 2.8 | 0.8 | 1.0 | 1.8 | 1.6 |
| 1.58/1.0 | 1.00 | 1.10 | 6.01 | 2.4 | 0.7 | 1.0 | 0.4 | 1.4 |
| 2.3/1.0 | 1.00 | 1.07 | 1.07 | 2.5 | 0.5 | 0.7 | 1.5 | 1.4 |
| 3.0/1.0 | 1.00 | 0.99 | 2.41 | 2.1 | 0.5 | 0.5 | 1.4 | 1.3 |
| 4.0/1.0 | 1.00 | 1.00 | 2.80 | 2.0 | 0.5 | 0.4 | 1.2 | 1.2 |
| 5.0/1.0 | 1.00 | 0.99 | 3.21 | 2.0 | 0.4 | 0.4 | 1.2 | 1.2 |

It is evident from Table III that the solubilities of the resulting compounds in anhydrous ethanol and 95 percent ethanol increase with the amount of trimethylolpropane in the resulting complex. However, maximum solubility in alcohol is not the only desideratum in an anti-perspirant. Since astringency is associated with the aluminum content of the compounds, it is also desirable to have a high aluminum content in the materials, providing the high aluminum compounds meet a minimum solubility standard in ethanol. For the purposes of pre- In Table IV below are shown the solubility properties of a number of compounds formed by the reaction of a preferred chlorohydroxy compound and numerous typical hydroxy compounds of the kind earlier described in this application. In each case, the mole ratio of chlorohydroxide to hydroxy compound employed is a preferred ratio of about 2.3 mol to 1. The aluminum compound used in each case is $Al_2Cl(OH)_5$. It will be noted that each of the compounds formed meets the minimum alcohol test in anhydrous ethanol and ethanol.

TABLE IV

| Hydroxy Compound | Ratio by Analysis in Final Product | | | Solubility (g./ml.) | | | | |
|---|---|---|---|---|---|---|---|---|
| | 2Al | Cl | $H_2O$ | $H_2O$ | Anhydrous Ethanol | 95% Ethanol | Propylene Glycol | Glycerol |
| Ethylene Glycol | 1.00 | 1.18 | 2.57 | 2.2 | 0.5 | 0.6 | 1.5 | 1.4 |
| Diethylene Glycol | 1.00 | 1.02 | 1.96 | 2.3 | 0.5 | 0.7 | 1.6 | 1.6 |
| Triethylene Glycol | 1.00 | 0.88 | 1.99 | 2.7 | 0.6 | 0.9 | 1.9 | 1.6 |
| Tetraethylene Glycol | 1.00 | 1.04 | 2.35 | 2.6 | 0.6 | 0.8 | 1.6 | 1.6 |
| Trimethylol Propane | 1.00 | 1.07 | 1.07 | 2.5 | 0.5 | 0.7 | 1.5 | 1.4 |
| Propylene Glycol | 1.00 | 1.03 | 2.33 | 2.1 | 0.6 | 0.8 | 1.4 | 1.4 |
| 1,4-butanediol | 1.00 | 1.37 | 2.12 | 2.10 | 0.5 | 0.7 | 1.6 | 1.6 |
| Dipropylene Glycol | 1.00 | 1.04 | 2.35 | 2.3 | 0.5 | 0.7 | 1.6 | 1.6 |
| 1,2,6-hexanetriol | 1.00 | 0.96 | 2.11 | 2.2 | 0.7 | 0.9 | 1.8 | 1.6 |
| Glycerine | 1.00 | 1.08 | 0.62 | 2.0 | 0.5 | 0.7 | 1.6 | 1.4 |
| 2-methyl, 2-ethyl-1,3-propanediol | 1.00 | 1.0 | 2.47 | 2.0 | 0.6 | 0.7 | 1.6 | 1.4 |
| 1,3-butanediol | 1.00 | 1.03 | 2.24 | 1.9 | 0.5 | 0.7 | 1.4 | 1.2 |
| Ethylene glycol ethyl ether | 1.00 | 1.0 | 2.52 | 1.8 | 0.3 | 0.5 | 0.1 | 1.2 |
| Ethylene glycol methyl ether | 1.00 | 1.06 | 3.51 | 2.0 | 0.4 | 0.6 | 1.4 | 1.4 |
| Diethylene glycol methyl ether | 1.00 | 1.03 | 2.61 | 2.2 | 0.5 | 0.7 | 1.8 | 1.6 |
| Diethylene glycol ethyl ether | 1.00 | 1.04 | 2.04 | 2.0 | 0.5 | 0.6 | 1.6 | 1.3 |
| 2-methyl-2,4-pentanediol | 1.00 | 0.99 | 2.68 | 2.0 | 0.5 | 0.6 | 1.4 | 1.2 |
| 1,4-butenediol | 1.00 | 0.99 | 2.05 | 1.7 | 0.4 | 0.4 | 0.1 | 1.5 |
| 1,2,4-butanetriol | 1.00 | 0.99 | 2.43 | 1.9 | 0.5 | 0.6 | 1.8 | 1.6 |
| Diglycerol | 1.00 | 0.98 | 2.10 | 2.7 | 0.7 | 0.7 | 2.0 | 2.0 |

Although specific embodiments have been shown and described, it is to be understood that they are illustrative and are not to be construed as limiting on the scope and spirit of the invention.

What is claimed is:

1. The method of making an alcohol-soluble, glycol-soluble liquid or crystalline astringent product which comprises contacting an aluminum compound of the formula $Al_2Cl_{6-x}(OH)_x$ where $x$ is an integer from zero to five, with a hydroxylic reagent selected from the group consisting of aliphatic alcohols having at least two hydroxy groups and aliphatic glycol monoethers, in the presence of sufficient water to dissolve said aluminum compound and then removing water from the system by evaporation to form said astringent product.

2. The method as in claim 1 wherein said hydroxylic reagent is an alkylene glycol.

3. The method as in claim 1 wherein said aluminum compound is an aluminum chlorohydroxide.

4. The method as in claim 1 wherein the mol ratio of aluminum compound to hydroxylic reagent is between about 6:1 and about 1:6.

5. The method as in claim 1 wherein said aluminum compound is an aluminum chlorohydroxide and said hydroxylic reagent is trimethylolpropane.

6. The method as in claim 1 wherein said aluminum compound is an aluminum chlorohydroxide and said hydroxylic reagent is propylene glycol.

7. An astringent aerosol composition comprising an effective amount of an astringent product prepared according to claim 1 dissolved in a liquefied aerosol propellant in the presence of a cosolvent.

8. An astringent aerosol composition as in claim 7 wherein said astringent product is dissolved in a liquefied halogenated hydrocarbon propellant in the presence of ethanol.

9. An astringent aerosol composition as in claim 8 wherein said astringent is formed between an aluminum chlorohydroxide and trimethylolpropane.

10. An astringent aerosol composition as in claim 8 wherein said astringent is formed between an aluminum chlorohydroxide and propylene glycol.

References Cited

UNITED STATES PATENTS

| | | | |
|---|---|---|---|
| 2,872,379 | 1/1959 | Neumann et al. | 167—90 |
| 2,890,987 | 6/1959 | Hilfer | 167—90 |
| 2,893,918 | 7/1959 | Abramson | 167—90 |
| 2,917,366 | 12/1959 | Hansford | 260—448 X |
| 2,466,445 | 4/1949 | Landau | 260—448 |
| 2,823,169 | 2/1958 | Brown et al. | 260—448 X |
| 3,030,274 | 4/1962 | Grant | 260—448 X |

FOREIGN PATENTS 128,506    7/1948    Australia.

TOBIAS E. LEVOW, *Primary Examiner.*

HELEN M. McCARTHY, A. LOUIS MONACELL,
*Examiners.*

I. R. PELLMAN, H. M. S. SNEED,
*Assistant Examiners.*